UNITED STATES PATENT OFFICE.

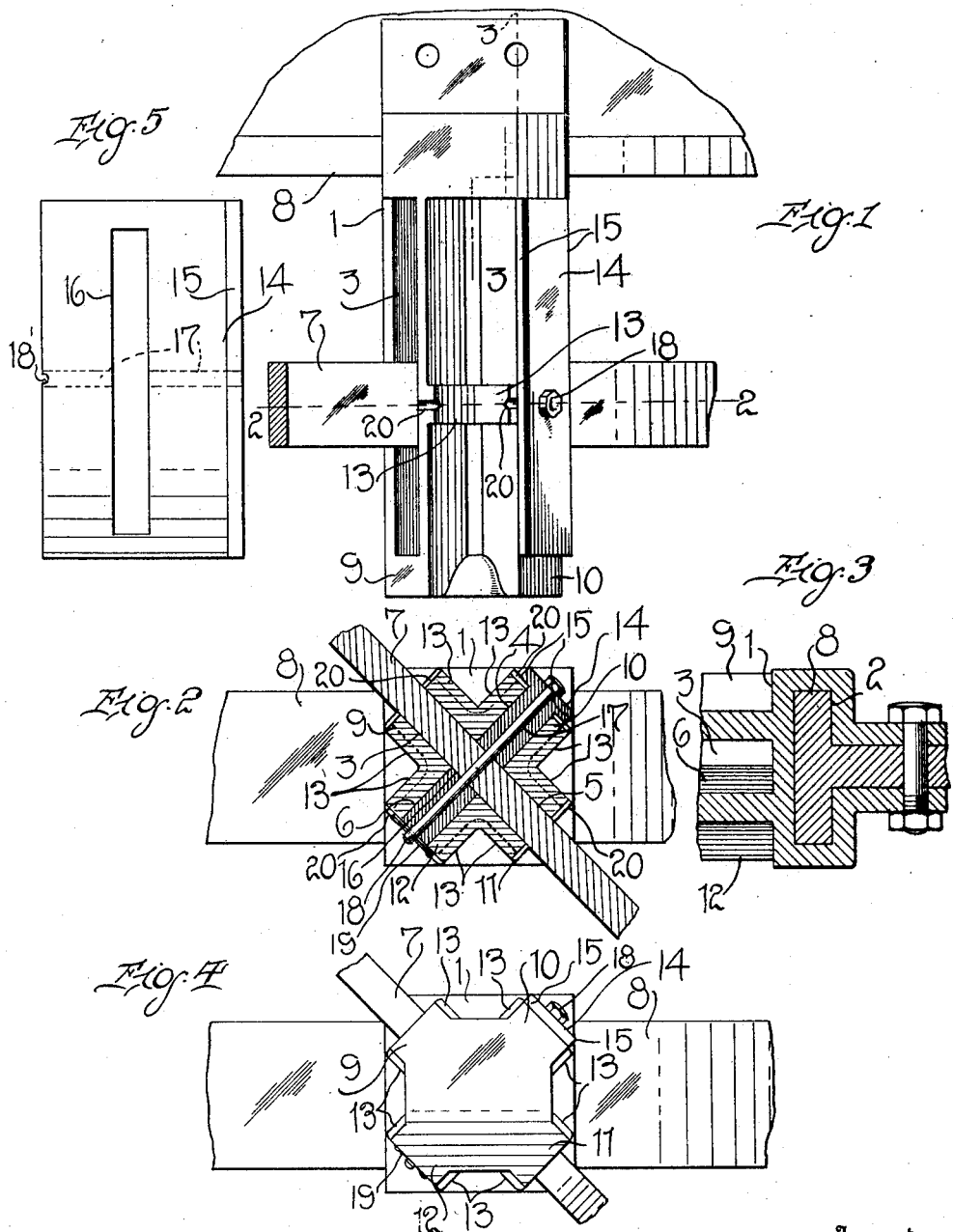

HORACE Z. EBBS, OF KNOXVILLE, TENNESSEE.

REVERSIBLE FULCRUM FOR BRAKE-BEAMS.

1,112,125.  Specification of Letters Patent.  Patented Sept. 29, 1914.

Application filed April 1, 1914. Serial No. 828,886.

*To all whom it may concern:*

Be it known that I, HORACE Z. EBBS, a citizen of the United States, residing at Knoxville, in the county of Knox and State of Tennessee, have invented certain new and useful Improvements in Reversible Fulcrums for Brake-Beams, of which the following is a specification, reference being had to the accompanying drawings.

This invention relates generally to brake beams and particularly to a novel form of fulcrum therefor.

The object of the invention is in a ready, novel and thoroughly practical manner and without shifting its position relative to the brake beam, to adapt a fulcrum for use in connection with either a right or a left hand brake beam, thereby to eliminate the necessity of providing two styles of fulcrums to equip the brake beams of a single truck, and thus reduce by one-half the stock heretofore required for that purpose.

With the above and other objects in view, as will appear as the nature of the invention is better understood, the same consists, generally stated, in a reversible brake beam fulcrum embodying a clamp of any preferred construction, to be rigidly assembled with the brake beam and a head integral with the clamp. The head is provided with all-through slots disposed obliquely to the longitudinal axis of the brake beam that constitute guides to receive the brake lever, the outer ends of the guides being closed. The head, is by preference, cruciform in cross section to provide a web-like structure, which will not only possess greater strength but will reduce the weight of the structure to the minimum, the intermediate portion of the head being reinforced by ribs formed integral with the outer surfaces of the arms of the head and serving to reinforce the latter at the point that will be subjected to greatest strain, namely where the brake lever is pivoted.

In conjunction with the head is employed a filler block that is designed to engage the guides not occupied by the brake lever, the block being provided with flanges to rest upon the upper face of the arm with which it engages and having a longitudinal slot to register with the guides of the engaged arms, and with an all-through orifice to receive the pin that holds the brake lever combined for pivotal movement with the block, the pin being assembled with the head and operating to lock the block in position by means of an ordinary cotter pin.

From the general description thus given it will be seen that by the angular disposition of the guides within the head relative to the brake beam, that one fulcrum may readily be employed either for a right or a left hand brake beam, as it will only be necessary to shift the filler block from one to the other set of guides in order to accomplish the reversion.

Further and more specific details of construction will be hereinafter more fully described and claimed.

In the accompanying drawings forming a part of the specification and in which like characters of reference indicate corresponding parts: Figure 1 is a top plan view, partly in section, displaying the fulcrum disposed upon a brake beam; Fig. 2 is a transverse sectional view taken on the line 2—2 of Fig. 1; Fig. 3 is a longitudinal sectional view taken on the line 3—3 of Fig. 1; Fig. 4 is a view in front elevation of the fulcrum and a portion of the brake beam; and Fig. 5 is a view in front elevation of a filler block used in connection with the fulcrum.

The fulcrum comprises a clamp 1 which may be of a construction to adapt it for assemblage with any form of brake beam, that herein shown being provided with a T-shaped recess 2 to be engaged by the ordinary brake beam, which is of like contour in cross section.

Projecting from the clamp and integral therewith is a head, which is provided with four longitudinal slots, 3, 4, 5 and 6, for a purpose that will presently appear. These slots constitute guides for the brake lever 7, and are disposed at opposite oblique angles to the longitudinal axis on the brake beam 8, so as to impart the required angular pitch to the brake lever to enable it to be connected with the operating parts in the usual manner. The outer end of the head is solid, so as to impart rigidity to the structure as a whole. As shown in Fig. 2, the head is of cruciform contour in cross section, providing thereby four arms 9, 10, 11 and 12 through which extend the guides 3—6 above referred to. The provision of these arms constitutes the head a skeleton structure, which as is well known will possess greater spring than would a solid casting and moreover materially reduces the weight of the article as a whole. Intermediate of the ends of the head and exteriorly thereof, are cast reinforcing ribs 13 which serve to strengthen the head at the point where it is most needed, namely where the brake lever is pivoted.

Combined with the head and arranged to engage either set of guides is a one-piece filler block 14 provided with outstanding flanges 15 that are designed to rest upon the upper surface of one of the arms at the upper side of the head when the like arm on the same side is engaged by the block. The block is of a size to extend entirely through two registering guides, and is provided with a longitudinal all-through slot 16 to register with either pair of oppositely disposed slots, and with a transverse orifice 17 that is designed to receive a pin 18 that serves to hold the brake lever assembled with the head. The block will lie flush with the under side of the head, and is provided in its lower face with a transverse slot 18' that is designed to be engaged by the shank of a cotter pin 19 that projects through the lower end of the pin 18, the under reinforces 13 being provided with recesses 20 also to receive the shank of the cotter pin. This cotter pin not only serves to prevent the pin 18 from working out of the filler block, but also serves to lock the latter in the head.

From the foregoing description it will be seen that should it be desired to convert a left hand brake beam into a right hand one, it will only be necessary to shift the filler block to the required position, and then assemble the brake lever with the block and with the head, whereupon the change is complete.

The adoption of this form of fulcrum to a brake beam already in use will require no change in the structural arrangement either of the latter or of the brake lever, and further no shifting of the fulcrum relative to the beam will be required.

Having thus described my invention, what I claim is:

1. A brake beam fulcrum having brake lever receiving guides disposed at right angles to each other and a one-piece filler for one guide when the other is engaged.

2. A brake beam fulcrum having brake lever receiving guides disposed at right angles to each other, a one-piece filler for one guide when the other is engaged by a brake lever, and a brake lever operating pin carried by the filler.

3. A brake beam fulcrum comprising an attaching clamp and a head, the latter being cruciform in cross section and provided with longitudinally disposed brake lever receiving guides disposed at right angles to each other and obliquely to the vertical axis of the head, and a one-piece filler for one guide when the other is engaged by a brake lever.

4. A brake beam fulcrum comprising an attaching clamp and a head, the latter being cruciform in cross section and provided with longitudinally disposed brake lever receiving guides disposed at right angles to each other and obliquely to the vertical axis of the head, a one-piece filler for one guide when the other is engaged by a brake lever, and a brake lever pivoting pin carried by the filler.

In testimony whereof I hereunto affix my signature in the presence of two witnesses.

HORACE Z. EBBS.

Witnesses:
WM. HATCHER,
T. W. FIELDS.

Copies of this patent may be obtained for five cents each, by addressing the "Commissioner of Patents, Washington, D. C."